UNITED STATES PATENT OFFICE.

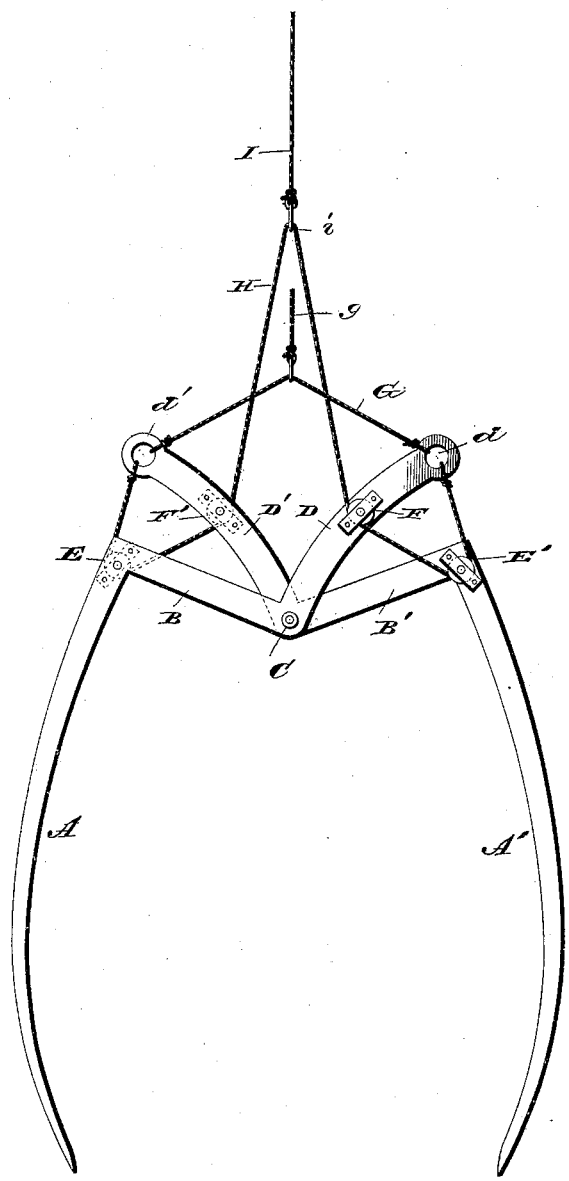

SIMON K. LUCKY, OF LONG BOTTOM, OHIO.

HAY-FORK.

SPECIFICATION forming part of Letters Patent No. 409,478, dated August 20, 1889.

Application filed May 9, 1889. Serial No. 310,170. (No model.)

*To all whom it may concern:*

Be it known that I, SIMON K. LUCKY, a citizen of the United States of America, residing at Long Bottom, in the county of Meigs and State of Ohio, have invented certain new and useful Improvements in Hay-Forks; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to certain new and useful improvements in hay forks or grapples; and it consists in a fork having two tines, the upper ends of which are provided with inwardly-projecting portions, by means of which the tines are pivoted together, each of said tines above their pivotal points having projecting arms, said projecting arms and tines having eyes and pulleys for connecting operating-cords thereto, so that the tines can be caused to enter the hay in an open position, and when raised will be caused to close upon the load, other cords being provided for operating the tines to separate them to permit the load to drop, as will be hereinafter fully set forth.

In the accompanying drawing I have illustrated my improved hay-fork by a side view.

A and A' refer to the tines of the fork, which curve slightly, as shown, said tines having formed integral with their upper ends inwardly-projecting bars B and B', at the inner ends of which the tines are pivoted to each other, as at C. Beyond the pivotal point of the tines they are provided with outwardly-extending members D and D', in the ends of which are formed eyes or loops $d$ and $d'$ for connecting the operating-cords thereto. The fork at the junction of the parts A and B and A' and B' are provided on opposite sides with pulleys E and E', and the members D and D' are provided near their centers with pulleys F and F'.

G refers to a rope or other flexible connection, the ends of which are secured to the eyes $d$ and $d'$ in the outer ends of the members D and D', and this flexible connection G is of such a length that it will limit the separation of the tines to the desired extent, and to the same is secured a flexible connection $g$, which, when drawn upon, will cause the tines to close upon the load of hay in which the fork has been inserted. To the loops or eyes $d$ and $d'$ is also attached a flexible connection H, which passes around the pulleys E and F' through a ring or loop $i$, and from thence over the pulleys F and E'.

In operation my improved hay fork or grapple may be used as follows: Before causing the tines to enter the hay both connections I and G are loosened, which will permit the tines to move upon their pivot to separate the lower ends thereof. After the tines have been inserted in the hay, by drawing upon the connection I the members D and D' will be drawn toward the members B and B', thus closing the tines upon the load, and the load may be elevated and carried to the desired distance. Now when it is desired to deposit the load, by simply slackening upon the connection $g$ and drawing upon the connection I the members D and D' will separate as well as the tines, and thus release the load.

It will be observed that the pulleys, over which each end of the flexible connection H passes, are on opposite sides of the members of the hay-fork, and by this construction the ends of the members D and D' will strike against the loops or straps in which the pulleys E and E' are secured should the flexible connection G be long enough to permit this excess of movement, and under no circumstances can the position of the pulleys become such that they will be inoperative and prevent the tines opening when the cord I is drawn upon. It will also be noted that the upper members D and D' have flat surfaces which will permit said members to move one upon the other, so that the lower ends of the tines will cross when the load will permit the same.

Having thus described my invention, what I claim as new, and desire to secure by Letters Patent, is—

The combination, in a hay-fork, of the tines A and A', having members B and B' and D and D' formed integral therewith, pulleys E and E', located on opposite sides at the junction of the tines and the members B and B', pulleys F and F', located between the pivotal point of connection and ends of the members D and D', flexible connection G, attached to the loops or eyes $d$ and $d'$, and a flexible connection H, also connected to said loops or eyes and passed over the pulleys, and operating-cord I, the parts being organized substantially as shown, and for the purpose set forth.

In testimony whereof I affix my signature in presence of two witnesses.

SIMON K. LUCKY.

Witnesses:
M. M. LAURENCE,
WM. LUCKY.